(12) United States Patent
Nagao et al.

(10) Patent No.: US 6,364,495 B1
(45) Date of Patent: Apr. 2, 2002

(54) BACK MIRROR COMPRISING AUTOMATIC GLARE-PROOF FUNCTION

(75) Inventors: Mitsuyoshi Nagao; Hidenori Sato, both of Shizuoka (JP)

(73) Assignee: Murakami Corporation, Shizuoka (JP)

(*) Notice: Subject to any disclaimer, the term of this patent is extended or adjusted under 35 U.S.C. 154(b) by 0 days.

(21) Appl. No.: 09/660,682

(22) Filed: Sep. 13, 2000

(30) Foreign Application Priority Data

Oct. 6, 1999 (JP) .......................................... P11-285288

(51) Int. Cl.[7] ................................................. G02B 5/08
(52) U.S. Cl. ........................ 359/603; 359/604; 359/608; 359/609
(58) Field of Search ................................ 359/603, 604, 359/608, 609, 601, 602, 265, 267, 275, 266, 884; 256/214 AL, 205, 201.1, 214 LS

(56) References Cited

U.S. PATENT DOCUMENTS

| | | | |
|---|---|---|---|
| 4,697,883 A | | 10/1987 | Suzuki |
| 4,886,960 A | | 12/1989 | Molyneux et al. |
| 4,896,030 A | * | 1/1990 | Miyaji ........................ 250/201 |
| 5,469,296 A | * | 11/1995 | Ohno et al. .................. 359/603 |
| 5,675,438 A | * | 10/1997 | Nagao et al. ................ 359/603 |
| 5,883,605 A | | 3/1999 | Knapp |
| 6,089,721 A | * | 7/2000 | Schierbeek .................. 359/603 |
| 6,210,008 B1 | * | 4/2001 | Hoekstra et al. ............ 359/603 |

FOREIGN PATENT DOCUMENTS

| | | |
|---|---|---|
| EP | 0 286 401 A | 10/1988 |
| JP | 6-60540 | 8/1994 |

OTHER PUBLICATIONS

Patent Abstract of Japan 2000142223 of May 23, 2000.
Patent Abstract of Japan 11344731 A of Dec. 14, 1999.

* cited by examiner

*Primary Examiner*—Mohammad Sikder
(74) *Attorney, Agent, or Firm*—Michael J. Striker

(57) ABSTRACT

A back mirror 1 comprising an automatic glare-proof function of the present invention includes a battery E1, a daytime/nighttime deciding circuit 3 for deciding whether the current time is daytime or nighttime, an integrating circuit 4, an electronic switch FET1, a glare-proof/glare-non-proof deciding circuit 5 for deciding whether an EC mirror 2 is set to a glare-proof state or a glare-non-proof state, and a driving circuit 6 for applying a DC voltage to the EC mirror 2. The daytime/nighttime deciding circuit 3 is being constantly applied with a DC voltage from the battery E1. When the daytime/nighttime deciding circuit 3 has decided that the current time is daytime, the electronic switch FET1 is turned off, and when the daytime/nighttime deciding circuit 3 has decided that the current time is nighttime, the electronic switch FET1 is turned on. Therefore, the voltage is applied to the glare-proof/glare-non-proof deciding circuit 5 and the driving circuit 6 only when a decision has been made that the current time is nighttime. Thereby, the power consumption of the battery E1 can be decreased.

10 Claims, 4 Drawing Sheets

BACK MIRROR COMPRISING AUTOMATIC GLARE-PROOF FUNCTION

BACKGROUND OF THE INVENTION

1. Field of the Invention

The present invention relates to a back mirror for a vehicle capable of adjusting reflectance by having an electrochromic mirror (EC mirror) mounted on the vehicle, and relates, more particularly, to a technique for reducing power consumption of the EC mirror.

2. Description of the Prior Art

When a driver is driving a vehicle during nighttime, it often occurs that illumination light beams irradiated from the headlight of a vehicle following at the back of this vehicle are reflected by the back mirror (or an outer mirror or an inner mirror) and enter the driver's visual field so that the driver is glared by the beams. In order to prevent this problem, there has been conventionally invented and put into practical application an EC mirror that is arranged by having an electrochromic element (EC element) mounted on a back mirror so that a DC voltage is applied to this EC element to change reflectance, thereby preventing a driver from being glared by the light irradiated from the vehicle at the back of the driver's vehicle.

As has been widely known, when a DC voltage is applied to two input terminals in a forward direction, the surface of the EC mirror is colored to reduce the light reflectance so that the driver is prevented from being glared by the light reflected from the mirror. When a DC voltage is applied to the two input terminals in a backward direction or when the two input terminals are short-circuited, it is possible to return the light reflectance of the EC mirror to the original state.

Such an EC mirror has been conventionally known as disclosed, for example, in Japanese Utility Model Registration Publication No. 60540/94 (hereinafter referred to as a conventional example). FIG. 5 is an explanatory diagram showing a configuration of an EC mirror and its driving circuit described in this conventional example. As shown in FIG. 5, a DC power source 105 is connected to two input terminals 102 and 103 of an EC mirror 101 via a two-contact type and two-way switch 104.

When the switch 104 is operated to apply a voltage output from the DC power source 105 so as to set the input terminal 102 to a positive electrode and the input terminal 103 to a negative electrode, the EC mirror 101 is colored on its surface, which results in lowering of light reflectance. On the other hand, when the switch 104 is operated to apply a voltage output from the DC power source 105 so as to set the input terminal 102 to a negative electrode and the input terminal 103 to a positive electrode, the EC mirror 101 is discolored on its surface, which allows a light transmittance to be returned to the original state. Based on these operations, it is possible to change over between a glare-proof and a glare-non-proof.

According to the driving circuit of the above-described conventional EC mirror, however, it is necessary to keep the switch 104 depressed for a predetermined period of time in order to color or discolor the surface of the EC mirror 101, which is troublesome. In other words, the EC mirror 101 has a characteristic that the surface of the EC mirror 101 is gradually colored when a voltage is applied continuously to the input terminals 102 and 103 in a forward direction for a constant period of time, and that the EC mirror 101 is gradually discolored when a voltage is applied continuously to the input terminals 102 and 103 in a backward direction for a constant period of time. Therefore, the driver needs to keep depressing the switch.

SUMMARY OF THE INVENTION

It is an object of the present invention to provide a back mirror having an automatic glare-proof function capable of automatically switching between the coloring and discoloring of an EC mirror and capable of reducing power consumption of a DC power source.

According to one aspect of the present invention, there is provided a back mirror having an automatic glare-proof function, in which a DC voltage output from a battery E1 is normally supplied to a daytime/nighttime deciding circuit 3. Based on this arrangement, a first surrounding light sensor S1 makes a decision as to whether it is currently daytime or nighttime. When a decision has been made that the current time is daytime, an integrating circuit 4 operates to turn off an electronic switch FET1, thereby stopping a supply of DC voltage to a glare-proof/glare-non-proof deciding circuit 5 and a driving circuit 6. On the other hand, when a decision has been made that the current time is nighttime, the integrating circuit 4 operates to turn on the electronic switch FET1, thereby starting a supply of DC voltage to the glare-proof/glare-non-proof deciding circuit 5 and the driving circuit 6.

The integrating circuit 4 is set with a first time constant and a second time constant so that a time required for changing a decision from daytime to nighttime and a time required for changing a decision from nighttime to daytime can be set separately.

When a DC voltage has been applied to the glare-proof/glare-non-proof deciding circuit 5, a decision is made based on a backward light sensor S3 and a second surrounding light sensor S2 as to whether the EC mirror 2 is to be set to a glare-proof state or a glare-non-proof state. In other words, when the illuminance of the light from the back is large, the glare-proof/glare-non-proof deciding circuit 5 outputs a signal that makes the EC mirror 2 to the glare-proof state, and when the illuminance of the light from the back is small, the glare-proof/glare-non-proof deciding circuit 5 outputs a signal that makes the EC mirror 2 to the glare-non-proof state.

When the glare-proof/glare-non-proof deciding circuit 5 has output the signal that makes the EC mirror 2 to the glare-proof state, the driving circuit 6 applies a DC voltage to the EC mirror 2 so that the EC mirror 2 is set to a colored state, i.e. glare-proof state. On the other hand, when the glare-proof/glare-non-proof deciding circuit 5 has output the signal that makes the EC mirror 2 to the glare-non-proof state, the driving circuit 6 short-circuits between two input terminals Ta and Tb of the EC mirror 2 so that the EC mirror 2 in a colored state is switched to a discolored state, i.e. glare-non-proof state. In this way, it is possible to automatically change over between the glare-proof state and the glare-non-proof state.

Further, according to another aspect of the present invention, there is provided a back mirror having an automatic glare-prrof function, in which when the daytime/nighttime deciding circuit 3 has made a decision that the current time is nighttime, a DC voltage output A from the battery E1 is applied to the glare-proof/glare-non-proof deciding circuit 5 and the driving circuit 6. Therefore, it is possible to extremely reduce the power consumption of the battery E1, which elongates the cycle of replacing the battery E1.

In addition, since the glare-proof state and the glare-non-proof state of the EC mirror 2 can be automatically changed over between them, a driver does not need to operate to change over between the glare-proof state and the glare-non-proof state. As a result, a good operability as well as improvement of safety during the driving of the vehicle can be achieved.

Furthermore, according to the present invention, the daytime/nighttime deciding circuit 3 comprises a first Schmitt trigger circuit IC1-1, which makes it possible to prevent an occurrence of hunting without making a reaction to a slight change in the surrounding light. As a result, a secure decision can be made between the daytime and the nighttime.

DESCRIPTION OF THE PREFERRED EMBODIMENTS

Figure 1:
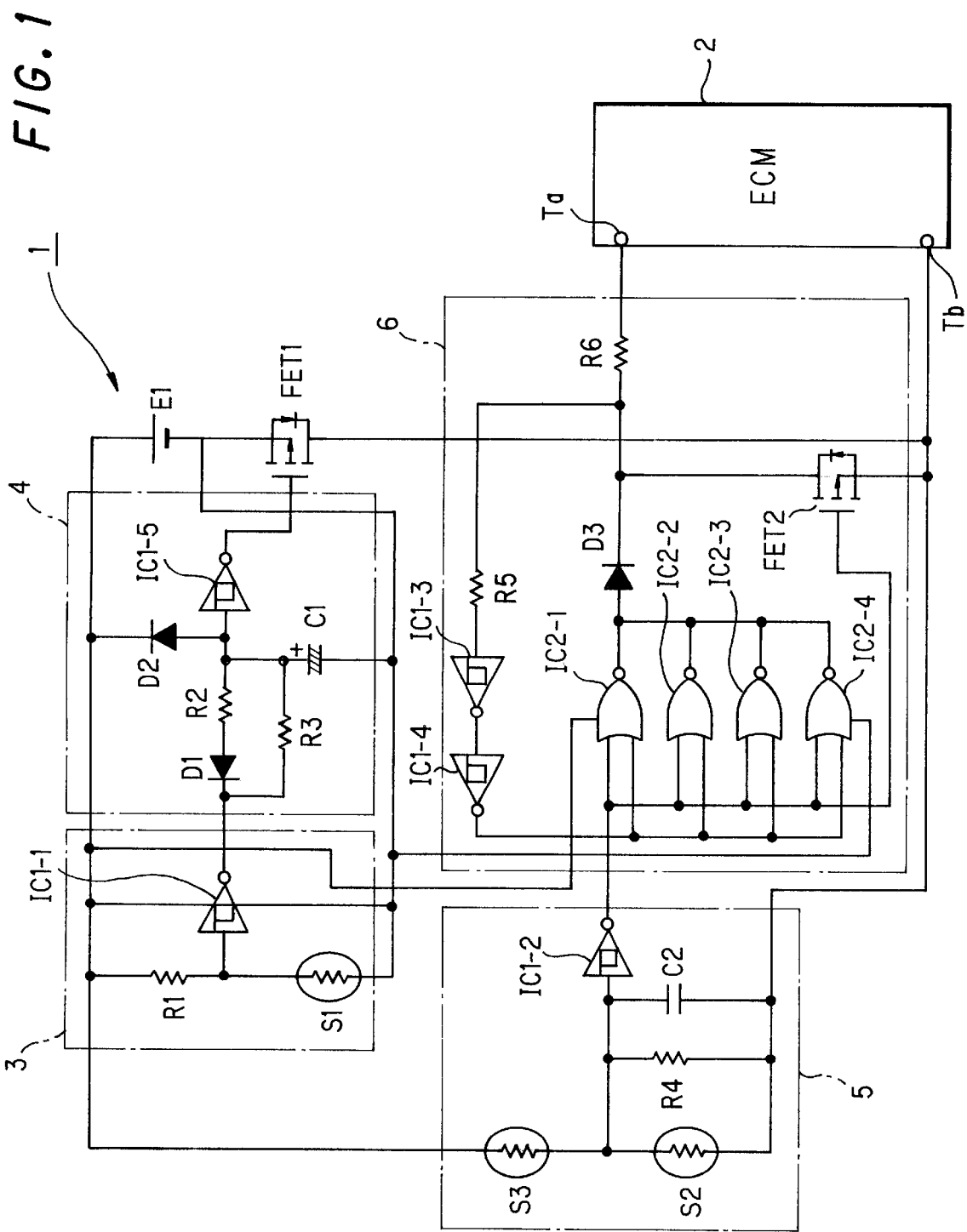
FIG. 1 is a circuit diagram showing a structure of a back mirror having an automatic glare-proof function relating to an embodiment of the present invention.

FIG. 1 is an explanatory diagram showing one embodiment of a back mirror relating to the present invention.

As shown in FIG. 1, a back mirror 1 includes a battery E1 for outputting a DC voltage, an EC mirror (electrochromic mirror) 2, a daytime/nighttime deciding circuit (daytime/nighttime deciding means) 3 for deciding whether the current time is daytime or nighttime, an electronic switch (switch means) FET1 connected to the battery E1, and an integrating circuit 4 for turning off the electronic switch FET1 based on a first time constant when the daytime/nighttime deciding circuit 3 has decided that the current time is daytime and for turning on the electronic switch FET1 based on a second time constant when the daytime/nighttime deciding circuit 3 has decided that the current time is nighttime.

The back mirror 1 further includes a glare-proof/glare-non-proof deciding circuit (glare-proof/glare-non-proof deciding means) 5 for deciding whether the EC mirror 2 is to be set to a glare-proof state or a glare-non-proof state based on the brightness of the surrounding of the vehicle and the brightness of the back of the vehicle, and a driving circuit (driving means) 6 for applying a DC voltage to between two input terminals Ta and Tb of the EC mirror 2 when the glare-proof/glare-non-proof deciding circuit 5 has decided that the EC mirror 2 is to be set to the glare-proof state and for short-circuiting between the two input terminals Ta and Tb of the EC mirror 2 when the glare-proof/glare-non-proof deciding circuit 5 has decided that the EC mirror 2 is to be set to the glare-non-proof state.

The daytime/nighttime deciding circuit 3 has a circuit having a resistor R1 (resistance) and a first surrounding light sensor S1 connected in series. A DC voltage output from the battery E1 is applied to both ends of the series-connected circuit. The first surrounding light sensor S1 is composed of a CdS element (cadmium sulfide element), and operates to have a large resistance when the illuminance of the surrounding light is small and have a small resistance when the illuminance of the surrounding light is large.

To a connection point P1 between the resistor R1 and the first surrounding light sensor S1, a first Schmitt trigger circuit (a first hysteresis circuit) IC1-1 for operating to invert an output signal is connected. When the surrounding has become bright and the resistance of the first surrounding light sensor S1 has become small, the voltage of the contact point P1 becomes small. As a result, an input signal of the first Schmitt trigger circuit IC1-1 becomes an "L" level, and its output signal becomes an "H" level (when a decision has been made that the current time is daytime). On the other hand, when the surrounding has become dark and the resistance of the first surrounding light sensor S1 has become large, the voltage of the contact point P1 becomes large. As a result, the output signal of the first Schmitt trigger circuit IC1-1 becomes the "L" level (when a decision has been made that the current time is nighttime).

Since the first Schmitt trigger circuit IC1-1 has hysteresis characteristics, the brightness of the surrounding light (a first illuminance) when the output signal of the first Schmitt trigger circuit IC1-1 has become the "L" level following a rise in the voltage of the point P1 (that is, following the darkening of the surrounding) is different from the brightness of the surrounding light (a second illuminance) when the output signal of the first Schmitt trigger circuit IC1-1 has become the "H" level following a fall in the voltage of the point P1 (that is, following the brightening of the surrounding).

Figure 2:
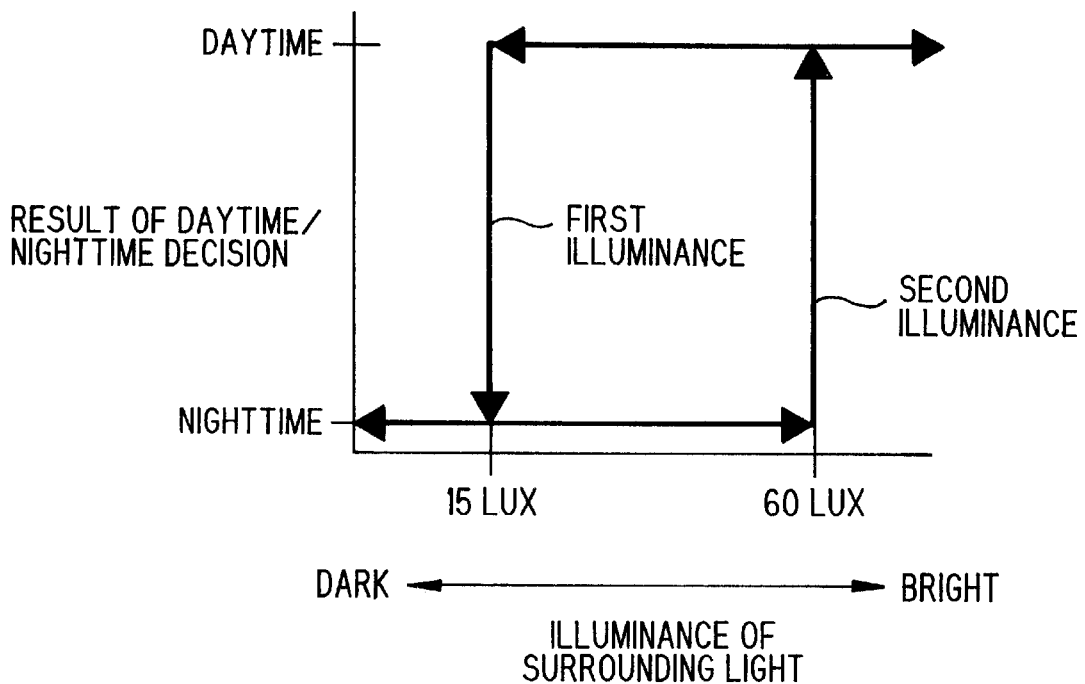
FIG. 2 is an explanatory diagram showing hysteresis characteristics of a first Schmitt trigger circuit.

This will be explained referring to the hysteresis characteristics shown in FIG. 2. When the surrounding has become bright and, for example, the illuminance has become 60 lux or above (the second illuminance), the daytime/nighttime deciding circuit 3 decides that the current time is daytime (that is, the output of the IC1-1 is at the "H" level). When the surrounding has become dark, for example, the illuminance has become 15 lux or below (the first illuminance) after the illuminance became 60 lux or above, the daytime/nighttime deciding circuit 3 decides that the current time is nighttime(that is, the output of the IC1-1 is at the "L" level).

The integrating circuit 4 shown in FIG. 1 comprises a fifth Schmitt trigger circuit IC1-5, resistors R2 and R3, diodes D1 and D2, and a capacitor C1. The fifth Schmitt trigger circuit IC1-5 has characteristics similar to those of the first Schmitt trigger circuit IC1-1 as described above, and has its input terminal (point P2) divided into four lines. A first branch line is connected to a positive electrode of the battery E1 via the diode D2. A second branch line is connected to an output terminal of the daytime/nighttime deciding circuit 3 (an output terminal of the first Schmitt trigger circuit IC1-1) via a circuit of the resistor R2 and the diode D1 connected in series. A third branch line is connected to an output terminal of the daytime/nighttime deciding circuit 3 via the resistor R3. A fourth branch line is connected to a negative electrode of the battery E1 via the capacitor C1.

An output terminal of the fifth Schmitt trigger circuit IC1-5 is connected to a gate terminal of the electronic switch FET1. The electronic switch FET1 is turned on when the output signal of the Schmitt trigger circuit IC1-5 has become the "H" level, and is turned off when the output signal of the Schmitt trigger circuit IC1-5 has become the "L" level.

The glare-proof/glare-non-proof deciding circuit 5 comprises a backward light sensor S3 structured by a CdS element, a second surrounding light sensor S2 structured by a CdS element, a second Schmitt trigger circuit (a second hysteresis circuit) IC1-2, a resistor R4, and a capacitor C2.

The backward light sensor S3 and the second surrounding light sensor S2 are mutually connected in series. One end of this series-connected circuit is connected to the positive electrode of the battery E1. A connection point P3 between the backward light sensor S3 and the second surrounding light sensor S2 is connected to an input terminal of the second Schmitt trigger circuit IC1-2. This connection point P3 is further connected to the input terminal Tb of the EC mirror 2 via the resistor R4, and is also connected to the input terminal Tb of the EC mirror 2 via the capacitor C2.

The resistance value of the backward light sensor S3 changes in response to the brightness at the backward of the vehicle. The resistance becomes small when the illuminance is large (that is, the backward is bright), and the resistance becomes large when the illuminance is small (that is, the backward is dark). The resistance of the second surrounding light sensor S2 changes in response to the brightness at the surrounding of the vehicle. The resistance value becomes small when the illuminance is large (that is, the surrounding is bright), and the resistance becomes large when the illuminance is small (that is, the surrounding is dark). Therefore, the voltage of the point P3 changes to become large when the backward has become bright as well as the surrounding has become dark while the electronic switch FET1 is on. On the other hand, the voltage of the point P3 changes to become small when the backward has become dark as well as the surrounding has become bright.

Since the second Schmitt trigger circuit IC1-2 has hysteresis characteristics, the glare of the surrounding light (a first glare) at the time when the output signal of the second Schmitt trigger circuit IC1-2 has become the "L" level following a rise in the voltage of the point P3 (that is, following the increase in the illuminance of the backward light) is different from the glare of the surrounding light (a second glare) when the output signal of the first Schmitt trigger circuit IC1-2 has become the "H" level following a fall in the voltage of the point P3 (that is, following the decrease in the illuminance of the backward light).

Figure 3:
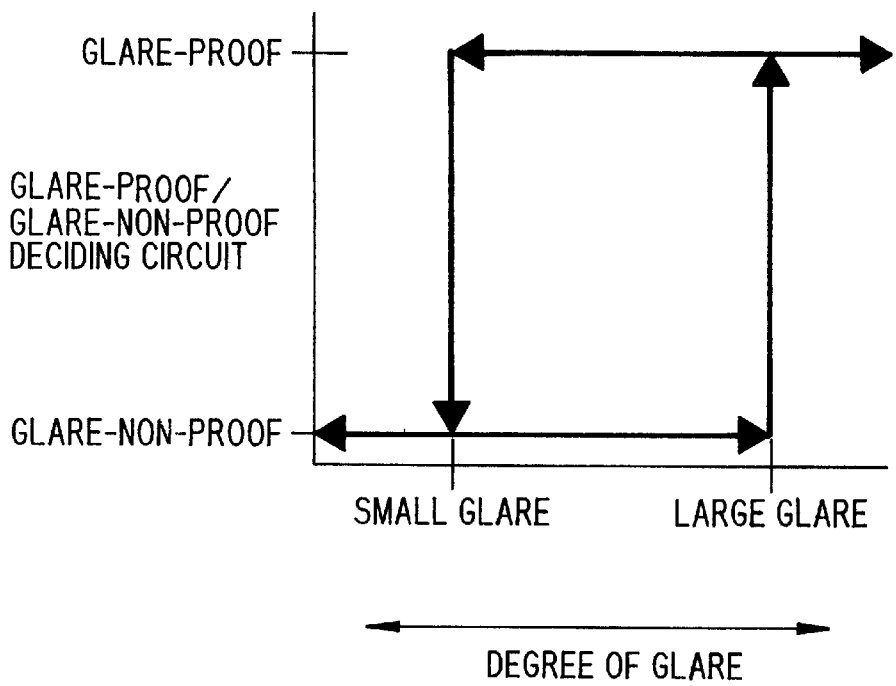
FIG. 3 is an explanatory diagram showing hysteresis characteristics of a second Schmitt trigger circuit.

This will be explained with reference to the hysteresis characteristics shown in FIG. 3. For example, when the back has become bright and also the degree of glare the driver feels has become larger than "a large glare" (the first glare), a signal showing the glare-proof state is output (that is, the output signal of the second Schmitt trigger circuit IC1-2 is set to the "L" level). Thereafter, when the back has become dark as well as the degree of glare the driver feels has reduced and has become smaller than "a small glare" (the second glare), a signal showing the glare-non-proof state is output (that is, the output signal of the second Schmitt trigger circuit IC1-2 is set to the "H" level).

The driving circuit 6 shown in FIG. 1 comprises a third Schmitt trigger circuit (a third hysteresis circuit) IC1-3 and a fourth Schmitt trigger circuit IC1-4 mutually connected in series, four NOR circuits (logic circuits) IC2-1 to IC2-4, a diode D3, resistors R5 and R6, and a short-circuiting switch FET2. The third Schmitt trigger circuit IC1-3 is provided with a second threshold value Vmax and a first threshold value Vmin which is smaller than the Vmax. As a result, when a voltage applied to the third Schmitt trigger circuit IC1-3 has exceeded the second threshold value Vmax, an output signal of the IC1-3 becomes the "L" level. And when the voltage applied to the third Schmitt trigger circuit IC1-3 has become smaller than the first threshold value Vmin, the output signal of the IC1-3 becomes the "H" level.

The four NOR circuits IC2-1 to IC2-4 are connected in parallel, respectively. One input terminal of each of the NOR circuits IC2-1 to IC2-4 is connected to the output terminal of the glare-proof/glare-non-proof deciding circuit 5 (the output terminal of the second Schmitt trigger circuit IC1-2), and the other input terminal of each of the NOR circuits IC2-1 to IC2-4 is connected to an output terminal of the fourth Schmitt trigger circuit IC1-4. A DC voltage is being supplied to each of the NOR circuits IC2-1 to IC2-4 from the battery E1.

An output signal of each of the NOR circuits IC2-1 to IC2-4 is connected to the input terminal Ta of the EC mirror 2 via the diode D3 and the resistor R6. A connection point P4 between the diode D3 and the resistor R6 is connected to the input terminal of the third Schmitt trigger circuit IC1-3 via the resistor R5. Further, this connection point P4 is connected to the input terminal Tb of the EC mirror 2 via the short-circuiting switch FET2. A gate of the short-circuiting switch FET2 is connected to the output terminal of the glare-proof/glare-non-proof deciding circuit 5 (the output terminal of the second Schmitt trigger circuit IC1-2).

Next, the operation of the present embodiment having the above-mentioned structure will be explained. As shown in FIG. 1, since a DC voltage supplied from the battery E1 is always being applied to the daytime/nighttime deciding circuit 3, a voltage signal is generated at the connection point P1 between the first surrounding light sensor S1 and the resistor R1. When the surrounding of the vehicle is bright (that is, during daytime), a resistance of the surrounding light sensor S1 becomes small, so that the voltage of the point P1 is small.

Therefore, the input signal of the first Schmitt trigger circuit IC1-1 becomes the "L" level, and the output signal of the IC1-1 becomes the "H" level so that a voltage is applied to the capacitor C1 mounted on the integrating circuit 4 based on a time constant (the first time constant) determined by the capacitor C1 and the resistor R3. After the application of the voltage to the capacitor C1 has been completed, the voltage at the point P2 becomes the "H" level so that the output signal of the fifth Schmitt trigger circuit IC1-5 becomes the "L" level, thereby the electronic switch FET1 is turned off. As a result, the voltage output from the battery E1 is not applied to the glare-proof/glare-non-proof deciding circuit 5 and the driving circuit 6. In other words, when the surrounding of the vehicle is bright, a power source voltage is not supplied to the circuit that changes over the EC mirror 2 from the glare-proof state to the glare-non-proof state or from the glare-non-proof to glare-proof state (However, a voltage is being applied to the NOR circuits IC2-1 to IC2-4).

When the surrounding of the vehicle has become dark and thereby the resistance of the first surrounding light sensor S1 has become large, the voltage of the point P1 rises. As shown in FIG. 2, when the illuminance of the surrounding light has become 15 lux or lower, the output signal of the first Schmitt trigger circuit IC1-1 is changed over from the "H" level to the "L" level (when a decision has been made that the current time is nighttime).

In this case, because the first Schmitt trigger circuit IC1-1 has hysteresis characteristics as described above, there will not occur a problem such as a hunting of the output signal in response to a slight change in the surrounding light.

When the output signal of the first Schmitt trigger circuit IC1-1 has become the "H" level, the voltage charged in the capacitor C1 is discharged via the parallel-connected circuit of the resistor R2 and the resistor R3. The time constant (the second time constant) in this case is determined by a parallel combined resistance of the resistor R2 and the resistor R3 and an electrostatic capacity of the capacitor C1. The voltage can be discharged in a shorter time than a time required for charging the voltage.

When the voltage stored in the capacitor C1 has been discharged, the voltage at the point P2 becomes the "L" level and the output signal of the fifth Schmitt trigger circuit IC1-5 becomes the "H" level, so that the electronic switch FET1 is turned on. As a result, a voltage output from the battery E1 is applied to the glare-proof/glare-non-proof deciding circuit 5 and the driving circuit 6.

In this case, since the fifth Schmitt trigger circuit IC1-5 has hysteresis characteristics, there will not occur a problem such as a hunting in response to a slight voltage variation at the point P2.

When the electronic switch FET1 has been turned off, a DC voltage output from the battery E1 is applied to the circuit connected in series between the backward light sensor S3 and the second surrounding light sensor S2 of the glare-proof/glare-non-proof deciding circuit 5. Then, the voltage at the connection point P3 between the backward light sensor S3 and the second surrounding light sensor S2 changes according to the illuminance of the surrounding light and the illuminance of the backward light.

For example, when the head light beams of a vehicle following the vehicle having the inventive mirror have been irradiated to the vehicle while the surrounding of the vehicle is dark, the resistance of the backward light sensor S3 decreases while the resistance of the surrounding light sensor S2 increases. As a result, the voltage at the point P3 rises to reach the "H" level, and the output signal of the second Schmitt trigger circuit IC1-2 becomes the "L" level. As no voltage has been applied between the input terminals Ta and Tb of the EC mirror 2, the voltage at the point P4 is at the "L" level, and the output signal of the fourth Schmitt trigger circuit IC1-4 becomes the "L" level.

Therefore, all the input signals of the four NOR circuits IC2-1 to IC2-4 become the "L" level, and their output signals become the "H" level. As a result, the voltage of the point P4 is switched from the "L" level to the "H" level so that a DC voltage will be applied between the two input terminals Ta and Tb of the EC mirror 2 in the forward direction in which the Ta becomes the positive electrode, and the Tb becomes the negative electrode. Thus, the surface of the EC mirror 2 becomes gradually colored to have a reduced reflectance, so that the EC mirror 2 is set to the glare-proof state.

When the voltage of the point P4 has become the "H" level, the voltage between the input terminals Ta and Tb of the EC mirror 2 gradually increases. When this voltage has exceeded the second threshold value Vmax of the third Schmitt trigger circuit IC1-3, the output signals of the third Schmitt trigger circuit IC1-3 and the fourth Schmitt trigger circuit IC1-4 are inverted respectively, while the output signal of the fourth Schmitt trigger circuit IC1-4 becomes the "H" level. Thus, all the output signals of the four NOR circuits IC2-1 to IC2-4 become the "L" level, and the voltage of the point P4 becomes the "L" level. As a result, the supply of voltage to the EC mirror 2 is stopped.

Thereafter, when the voltage between the two terminals Ta and Tb of the EC mirror 2 gradually decreases to become smaller than the first threshold value Vmin of the third Schmitt trigger circuit IC1-3, the output of the fourth Schmitt trigger circuit IC1-4 becomes the "L" level so that the supply of voltage to the EC mirror 2 is started again. As a result, the voltage supply and the stopping of the voltage supply to the input terminals Ta and Tb of the EC mirror 2 are repeated alternately as shown in FIG. 4, thereby the colored state of the EC mirror 2 will be maintained.

Figure 4:
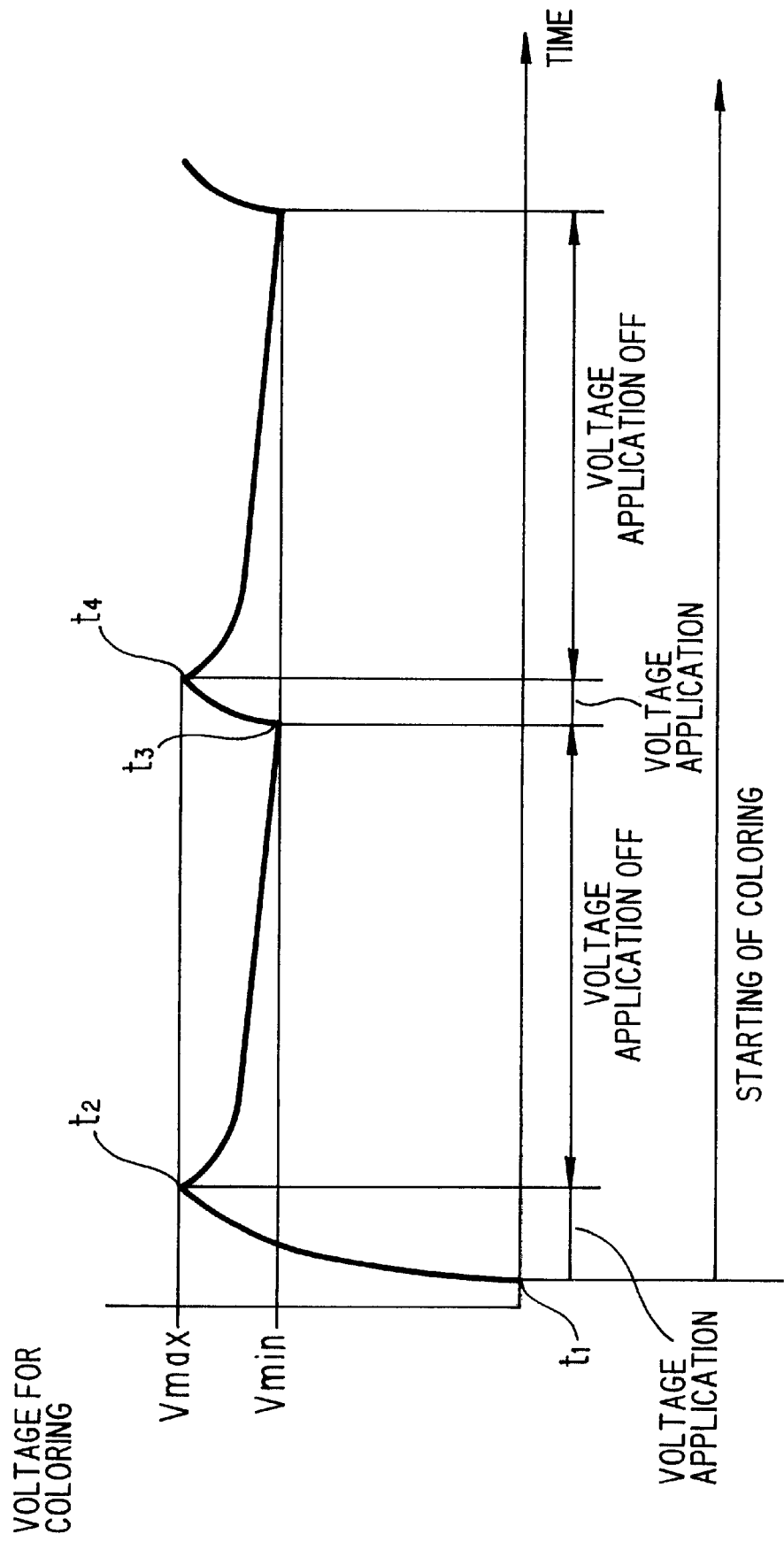
FIG. 4 is a timing chart diagram showing a state of on/off controlling of a voltage applied to an EC mirror.
Figure 5:
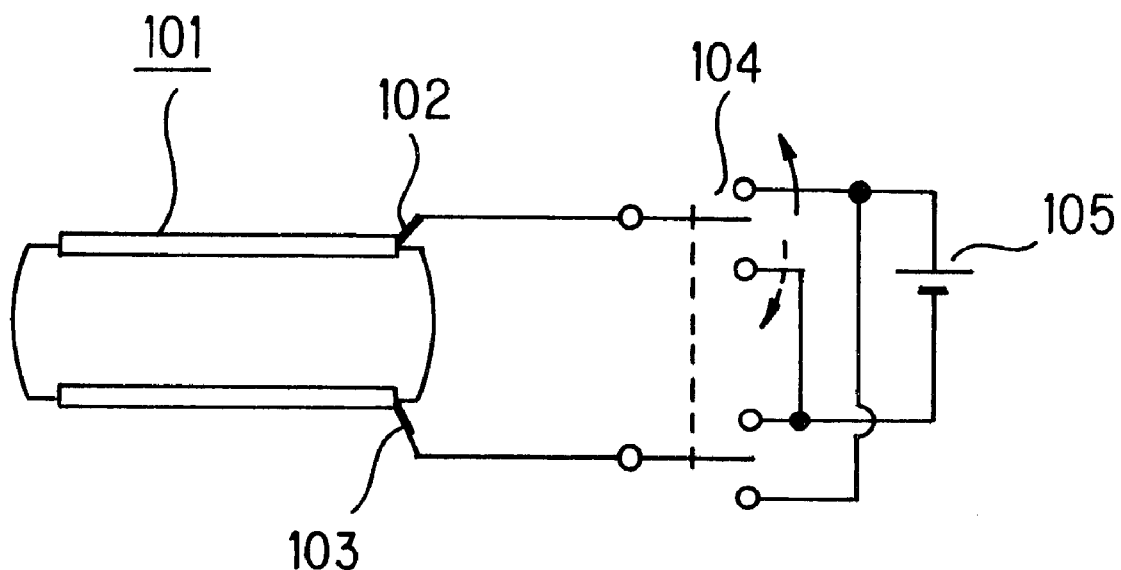
FIG. 5 is a circuit diagram of a conventional EC mirror.

In other words, as shown in FIG. 4, a voltage is applied to the input terminals Ta and Tb of the EC mirror 2 between times t1 and t2 to set the EC mirror 2 to the colored state such that when the voltage for coloring the EC mirror 2 has become Vmax at the time t1, the supply of voltage to the EC mirror 2 is stopped, and when the voltage for coloring has become Vmin at the time t3, the supply of voltage is started again. By repeating this operation, the colored state of the EC mirror 2 can be maintained, and as a result, power consumption of the battery E1 can be remarkably reduced.

Further, when the illuminance of the back of the vehicle has lowered so that the resistance of the backward light sensor S3 shown in FIG. 1 has become large, the voltage at the point P3 is switched to the "L" level. As a result, the output signal of the second Schmitt trigger circuit IC1-2 becomes the "H" level, so that all the signals supplied to one input terminal of each of the four NOR circuits IC2-1 to IC2-4 become the "H" level. Therefore, regardless of the output signal of the fourth Schmitt trigger circuit IC1-4, all the output signals of the four NOR circuits IC2-1 to IC2-4 become the "L" level so that no voltage will be applied to the input terminals Ta and Tb of the EC mirror 2.

At the same time, as the "H" level signal is supplied to the gate terminal of the short-circuiting switch FET2, the short-circuiting switch FET2 is turned on so that it is short-circuited between the input terminals Ta and Tb of the EC mirror 2 via the resistor R6. Thereby, the EC mirror 2 in the colored state is gradually discolored to return to the original state. In other words, when the head light beams of a vehicle following the vehicle having the inventive mirror are not irradiated, the reflectance of the EC mirror 2 returns to the original state (the glare-non-proof state). The coloring and the discoloring of the EC mirror 2 are automatically changed over in this way.

As explained above, according to the present embodiment, when the first surrounding light sensor S1 has decided that the current time is daytime, a DC voltage output from the battery E1 is not applied to the glare-proof/glare-non-proof deciding circuit 5 and the driving circuit 6. In the meantime, when the first surrounding light sensor S1 has decided that the current time is nighttime, the DC voltage is applied to the glare-proof/glare-non-proof deciding circuit 5 and the driving circuit 6. Therefore, based on this arrangement, it is possible to remarkably reduce power consumption of the battery E1, which enables the cycle of replacing batteries to make longer. Further, since a small battery can be used for a long time, it is possible to lighten the circuit.

Additionally, the switching from the glare-proof state to the glare-non-proof state or from the glare-non-proof to glare-proof state of the EC mirror 2 can be done automatically without requiring the driver to any troublesome operation. Thus, the safety during the operation can also be improved.

Moreover, since the daytime/nighttime deciding circuit 3 comprises a Schmitt trigger circuit IC1-1 having hysteresis characteristics, it is possible to avoid the problem that the output signal of the daytime/nighttime deciding circuit 3 brings about a hunting in response to a slight change of the surrounding light of the vehicle.

Further, the time constant (the second time constant) used at the time of discharging a voltage charged in the capacitor C1 mounted on the integrating circuit 4 is set faster than the time constant (the first time constant) used at the time of charging a voltage to the capacitor C1. In other words, the time required for changing a determination from the daytime to the nighttime is set shorter than the time required for changing the determination from the nighttime to the daytime. Based on this setting, for example, when the vehicle has entered into a tunnel in the daytime, a decision that the current time is nighttime can be made relatively fast, which enables the EC mirror 2 to be set as the glare-proof state. When the vehicle has exited from the tunnel, the electronic switch FET1 can be turned off after the EC mirror 2 has been sufficiently discolored.

Since the first time constant is set long, such a problem that daytime is erroneously determined as nighttime can be prevented, for example, when the vehicle has passed under trees or under a railroad overpass.

Further, as shown in FIG. 4, when the EC mirror 2 is set to a colored state by applying a DC voltage to the input terminals Ta and Tb, the colored state of the EC mirror 2 will be maintained while the application of the voltage and the stopping of the application of the voltage to the input terminals Ta and Tb are carried out alternately. Thus, the power consumption of the battery E1 will be further reduced. Particularly, if a solid type EC mirror 2 having a memory function at the time of coloring the EC mirror 2 is used, a leak current will become small when the state between the input terminals Ta and Tb are released at the time of coloring so that it will require a longer time to decrease the voltage for coloring. Therefore, the time required for applying a voltage (between the times t3 and t4 shown in FIG. 4) can be made shorter than the time (between the times t2 ant t3) for not applying the voltage.

Additionally, since the battery E1 is used as the DC power source, the installation work can be facilitated without requiring the connection of a wire harness between the vehicle main body and the mirror housing.

Although a hysteresis circuit has been explained by using a Schmitt trigger circuit as an example in the above embodiment, the present invention is not limited to this use. Instead of the Schmitt trigger circuit, any circuits having the hysteresis characteristics with an equivalent function can be used.

(Explanation of Symbols)

1 Back mirror
2 EC mirror
3 Daytime/nighttime deciding circuit (Daytime/nighttime deciding means)
4 Integrating circuit
5 Glare-proof/glare-non-proof deciding circuit (Glare-proof/glare-non-proof deciding means)
6 Driving circuit (Driving means)
E1 Battery (DC power source)
FET1 Electronic switch (Switching means)
FET2 Short-circuiting switch
S1 First surrounding light sensor
S2 Second surrounding light sensor
S3 Backward light sensor
IC1-1 First Schmitt trigger circuit (First hysteresis circuit)
IC1-2 Second Schmitt trigger circuit (Second hysteresis circuit)
IC1-3 Third Schmitt trigger circuit (Third hysteresis circuit)
IC1-4 Fourth Schmitt trigger circuit
IC1-5 Fifth Schmitt trigger circuit
IC2-1 to IC2-4 NOR circuits (Logic circuits)

What is claimed is:

1. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;

a switching means turned on when the daytime/nighttime deciding means has decided that the current time is nighttime;

a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and a driving means applied with a voltage output from the DC power source when the switching means has been turned on, wherein a coloring and a discoloring of the EC mirror will be changed over in response to the result of the decision made by the glare-proof/glare-non-proof deciding means, and the first surrounding light sensor is composed of an element of which resistance value varies according to the brightness of the surrounding light, and the daytime/nighttime deciding means includes a series-connected circuit of the first surrounding light sensor and a resistor in which a voltage output from the DC power source is applied to both ends of the series-connected circuit so that the daytime/nighttime deciding means detects a voltage at a connection point between the surrounding light sensor and the resistor so as to decide whether the current time is daytime or nighttime.

2. A back mirror comprising an automatic glare-proof function according to claim 1, wherein a first hysteresis circuit is provided at the connection point between the first surrounding light sensor and the resistor so that the daytime/nighttime deciding means decides whether the current time is daytime or nighttime while detecting an output signal from the first hysteresis circuit.

3. A back mirror comprising an automatic glare-proof function according to claim 1, wherein the first and second surrounding light sensors and the backward light sensor are composed of a cadium sulifide element (CdS element), respectively.

4. A back mirror comprising an automatic glare-proof function according to claim 1, wherein the EC mirror is composed of a solid type having a memory in the reflectance at the time of coloring.

5. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;

a switching means turned on when the daytime/nighttime deciding means has decided that the current time is nighttime;

a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and a driving means applied with a voltage output from the DC power source when the switching means has been turned on, wherein a coloring and a discoloring of the EC mirror will be changed over in response to the result of the decision made by the glare-proof/glare-non-proof deciding means; and an integrating circuit which is operated to turn on the switching means based on a first time constant when an output signal of the daytime/nighttime deciding means has been switched from a signal showing nighttime to a signal showing daytime, and being operated to turn off the switching means based on a second time constant when the output signal of the daytime/nighttime deciding means has been switched from the signal showing daytime to the signal showing nighttime.

6. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;

a switching means turned on when the daytime/nighttime deciding means has decided that the current time is nighttime;

a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and a driving means applied with a voltage output from the DC power source when the switching means has been turned on, wherein a coloring and a discoloring of the EC mirror will be changed over in response to the result of the decision made by the glare-proof/glare-non-proof deciding means; and the backward light sensor and the second surrounding light sensor are composed of an element of which resistance varies in response to the brightness of the surrounding, and the glare-proof/glare-non-proof deciding means includes a circuit connected in series between the backward light sensor and the second surrounding light sensor while a voltage output from the DC power source being applied to both ends of the series-connected circuit so as to decide whether the EC mirror is set to the glare-proof state or not based on a voltage at the connection point between the backward light sensor and the second surrounding light sensor.

7. A backward mirror comprising an automatic glare-proof function according to claim 6, wherein a second hysteresis circuit is provided at the connection point between the backward light sensor and the second surrounding light sensor so that the glare-proof/glare-non-proof deciding means decides whether the EC mirror is set to the glare-proof state or not while detecting an output signal from the second hysteresis circuit.

8. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;

a switching means turned on when the daytime/nighttime deciding means has decided that the current time is nighttime;

a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and a driving means applied with a voltage output from the DC power source when the switching means has been turned on, wherein a coloring and a discoloring of the EC mirror will be changed over in response to the result of the decision made by the glare-proof/glare-non-proof deciding means; and the driving means comprising a logic circuit which operates to apply a DC voltage to an input terminal of the EC mirror when the output signal from the glare-proof/glare-non-proof deciding means is a signal showing the glare-proof state; and a third hysteresis circuit provided with a first threshold value and a second threshold value larger than the first threshold value, in which a signal showing a stopping of a voltage supply to the EC mirror is output to the logic circuit when a voltage for coloring the EC mirror has become equal to or larger than the second threshold value, and a signal showing a starting of the voltage supply to the EC mirror is output to the logic circuit when a voltage for coloring the EC mirror has become equal to or smaller than the first threshold value.

9. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising

- a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;
- a switching means turned on when the daytime/nighttime deciding means has decided that the current time is nighttime;
- a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and
- a driving means applied with a voltage output from the DC power source when the switching means has been turned on, wherein a coloring and a discoloring of the EC mirror will be changed over in response to the result of the decision made by the glare-proof/glare-non-proof deciding means; and
- the driving means comprises a short-circuit switch for short-circuiting between the input terminals of the EC mirror when the output signal from the glare-proof/glare-non-proof deciding means is a signal showing the glare-non-proof state.

10. A back mirror comprising an automatic glare-proof function while having an EC mirror in which a light surrounding a vehicle and a light from the back of the vehicle are detected so as to change over between a glare-proof state and a glare-non-proof state of the EC mirror automatically in response to the results of the detection, said back mirror comprising

- a daytime/nighttime deciding means including a first surrounding light sensor that detects a surrounding light of the vehicle and is driven by a voltage output from a DC power source, and detecting whether a current time is daytime or nighttime based on the result of the detection made by the first surrounding light sensor;
- a switching means turned on when the daytime/nighttime deciding means has decided t ha t the current time is nighttime;
- a glare-proof/glare-non-proof deciding means including a second surrounding light sensor for detecting a light surrounding the vehicle and a backward light sensor for detecting a light from the back of the vehicle, both applied with a voltage output from the DC power source when the switching means has been turned on so as to decide whether the EC mirror is to be set to the glare-proof state or not based on the results of the detection by the second surrounding light sensor and the backward light sensor respectively; and
- a driving means applied with a voltage output from the DC power source when the switching means has been turned on, wherein a coloring and a discoloring of the EC mirror will be changed over in response to the result of the decision made by the glare-proof/glare-non-proof deciding means, and the DC power source is a battery.

* * * * *